(12) United States Patent
Takayama et al.

(10) Patent No.: US 11,368,624 B2
(45) Date of Patent: Jun. 21, 2022

(54) IMAGE CAPTURING APPARATUS AND CONTROL METHOD THEREOF

(71) Applicant: CANON KABUSHIKI KAISHA, Tokyo (JP)

(72) Inventors: Kazunori Takayama, Hachioji (JP); Yasushi Ohwa, Machida (JP); Minoru Sakaida, Kawasaki (JP); Yuji Omori, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/011,244

(22) Filed: Sep. 3, 2020

(65) Prior Publication Data

US 2021/0075968 A1 Mar. 11, 2021

(30) Foreign Application Priority Data

Sep. 6, 2019 (JP) .............................. JP2019-163270

(51) Int. Cl.
*H04N 5/232* (2006.01)
(52) U.S. Cl.
CPC ..... *H04N 5/23293* (2013.01); *H04N 5/23227* (2018.08)

(58) Field of Classification Search
CPC ...................... H04N 5/23293; H04N 5/23227
See application file for complete search history.

(56) References Cited

U.S. PATENT DOCUMENTS

2014/0071306 A1\* 3/2014 Kunishige ........ H04N 5/232935
348/220.1

FOREIGN PATENT DOCUMENTS

JP 2012-044566 A 3/2012

\* cited by examiner

*Primary Examiner* — Timothy J Henn
*Assistant Examiner* — Fayez A Bhuiyan
(74) *Attorney, Agent, or Firm* — Cowan, Liebowitz & Latman, P.C.

(57) ABSTRACT

An image capturing apparatus comprises an image sensor, and a controller that controls the image sensor to shoot images for display at a first cycle and controls to shoot a still image in response to the image shooting instruction. In a case where continuous shooting of still images is instructed during shooting the images for display at the first cycle, the controller changes a cycle at which the images for display are shot to a second cycle which corresponds to an integer multiple of speed of the continuous shooting while e continuous shooting is performed, and controls the image sensor to shoot the still images at the speed of the continuous shooting and shoot the images for display at the second cycle.

11 Claims, 4 Drawing Sheets

IMAGE CAPTURING APPARATUS AND CONTROL METHOD THEREOF

BACKGROUND OF THE INVENTION

Field of the Invention

The present invention relates to an image capturing apparatus and a control method thereof, and more particularly to a technique for displaying a captured image on a display device.

Description of the Related Art

Some image capturing apparatuses have a live view (LV) function of continuously capturing images and sequentially displaying the obtained images on a display device. In general, images for LV (hereinafter, referred to as "LV images") are shot at regular intervals and are sequentially displayed. Therefore, the user can record an image of a subject while confirming the subject in LV display.

When the image capturing apparatus has only one image sensor, the image sensor needs to output both image data for a still image and image data for LV images. Therefore, while the image sensor is driven to capture a still image, it cannot be driven to capture LV images. In particular, when performing continuous shooting of still images during LV display, the shooting timing of the still image and the shooting timing of the LV image may overlap depending on the shooting start timing and interval of the continuous shooting of the still images. In that case, since the LV image cannot be obtained, in the LV display, the screen freezes due to displaying of the LV image of the previous frame a plurality of times, or a so-called blackout occurs in which a fixed color is displayed on the entire display screen.

On the other hand, Japanese Patent Laid-Open No. 2012-044566 discloses a technique of switching between LV images and still images to be used for LV display. In this technique, a mode in which still images obtained during continuous shooting are down-sized and displayed, and a mode in which LV images are displayed, are switched depending on the state of the image capturing apparatus. As a result, the frequency of updating the LV display is increased when capturing still images.

However, in the technique described in Japanese Patent Laid-Open No. 2012-044566, since still images captured under shooting conditions different from those of the LV images are used for LV display, the LV display will look unnatural since a motion blur of the subject may occur due to a difference in exposure, and the brightness differs between the still images and the LV images.

SUMMARY OF THE INVENTION

The present invention has been made in consideration of the above situation, and increases the quality of LV display during continuous shooting of still images.

According to the present invention, provided is an image capturing apparatus comprising: an image sensor; and a controller that controls the image sensor to shoot images for display to he displayed on a display device at a predetermined first cycle and controls to shoot a still image in response to an image shooting instruction, wherein, in a case where continuous shooting of still images is instructed during shooting the images for display at the first cycle, the controller changes a cycle at which the images for display are shot to a second cycle which corresponds to an integer multiple of speed of the continuous shooting of the still images while the continuous shooting is performed, and controls the image sensor to shoot the still images at the speed of the continuous shooting and shoot the images for display at the second cycle.

Further, according to the present invention, provided is a control method of an image capturing apparatus having an image sensor comprising: shooting images for display to be displayed on a display device at a predetermined first cycle by the image sensor; changing, in a case where continuous shooting of still images is instructed during shooting the images for display at the first cycle, a cycle at which the images for display are shot to a second cycle which is an integer multiple of the continuous shooting speed of the still images while the continuous shooting is performed, shooting the still images at the speed of the continuous shooting and shooting the images for display at the second cycle by the image sensor.

Furthermore, according to the present invention, provided is a non-transitory computer-readable storage medium, the storage medium storing a program that is executable by a computer, wherein the program includes program code for causing the computer to perform a control method of an image capturing apparatus having an image sensor comprising: shooting images for display to be displayed on a display device at a predetermined first cycle by the image sensor; changing, in a case where continuous shooting of still images is instructed during shooting the images for display at the first cycle, a cycle at which the images for display are shot to a second cycle which is an integer multiple of the continuous shooting speed of the still images while the continuous shooting is performed, shooting the still images at the speed of the continuous shooting and shooting the images for display at the second cycle by the image sensor.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

Figure 1:
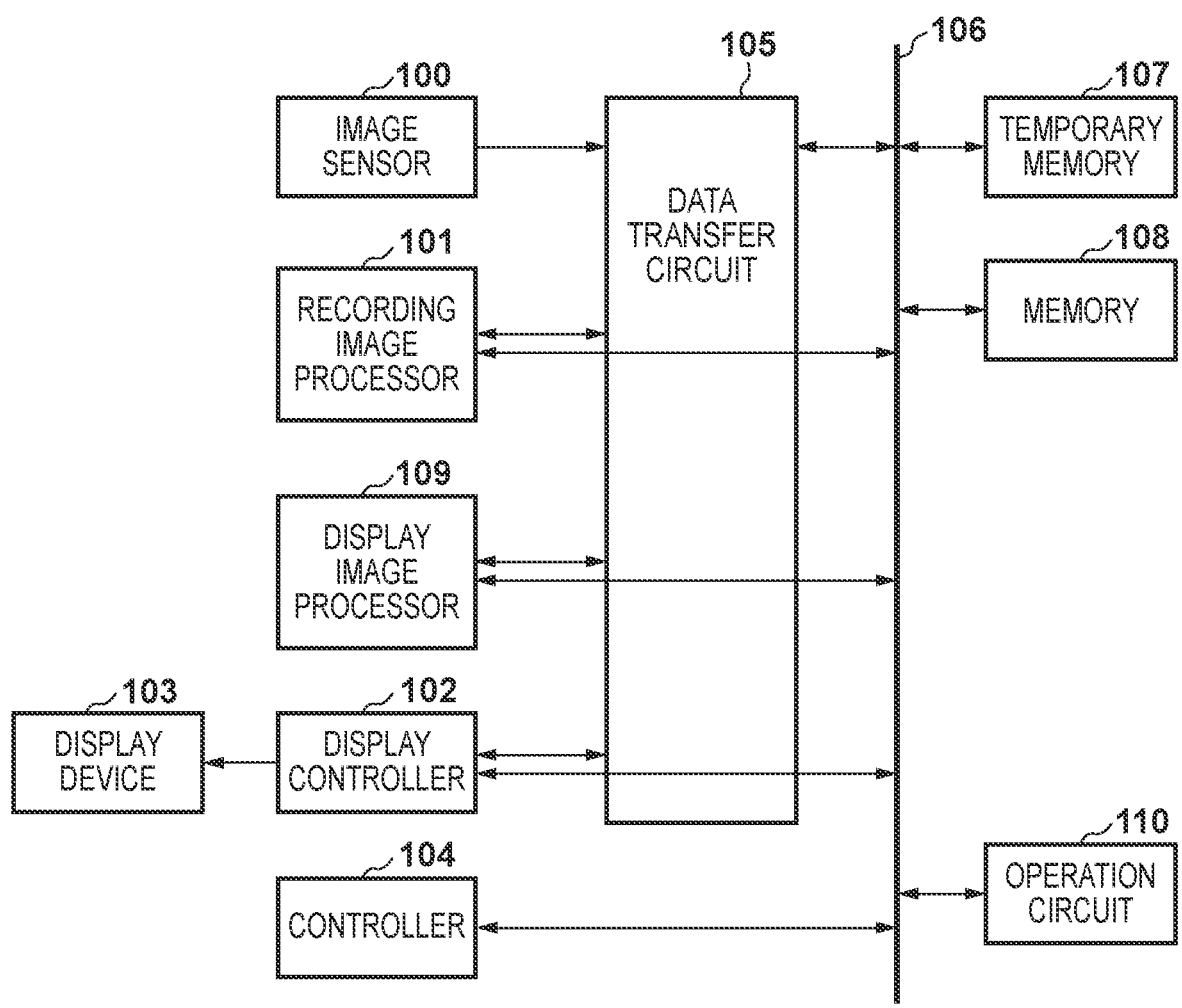
FIG. 1 is a block diagram showing a schematic configuration of an image capturing apparatus according to an embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

The case where the present invention is applied to an image capturing apparatus will be described below. Further, although the image capturing apparatus is described as a digital camera, it can be applied to various image capturing apparatuses such as a digital video camera, a smartphone, a camera-equipped mobile phone, and a dashboard camera.

FIG. 1 is a block diagram showing an example of the configuration of the digital camera according to the first embodiment.

In FIG. 1, an image sensor 100 is an image sensor such as a CCD or a CMOS sensor, and converts a received optical subject image into an electric signal (pixel signals) and outputs it. The pixel signals output from the image sensor 100 are written to a temporary memory 107 via a data transfer circuit 105.

A recording image processor 101 inputs pixel signals obtained by driving the image sensor 100 for still image shooting from the temporary memory 107 via the data transfer circuit 105, performs image processing, and generates image data of a still image. The image processing performed by the recording image processor 101 includes a plurality of processes, such as pixel correction, black level correction, shading correction, defect correction, white balance adjustment, correction for chromatic aberration of magnification, gamma correction, luminance/color signal generation processing, geometric deformation, noise reduction, scaling, and so forth. The image data of the still image generated by the recording image processor 101 is recorded in the temporary memory 107 via the data transfer circuit 105.

A display image processor 109 inputs pixel signals obtained by driving the image sensor 100 for LV image shooting from the temporary memory 107 via the data transfer circuit 105, performs image processing, and generates image data of an LV image. The display image processor 109 performs a plurality of image processes similar to those performed by the recording image processor 101, but since it is necessary to complete the generation of the LV image within the LV display cycle, the image processes performed by the display image processor 109 are simpler and faster than those performed by the recording image processor 101. The image data of the LV image generated by the display image processor 109 is output to a display controller 102 via the data transfer circuit 105.

Note that, in this embodiment, the recording image processor 101 for still images and the display image processor 109 for LV images are configured as different units, however, a common image processor may be used. In that case, for example, the time-division control may be performed such that the image processing of a still image is performed while the image processing of the LV image is not performed.

The display controller 102 inputs the image data of the LV image generated by the display image processor 109 via the data transfer circuit 105, and performs display control for displaying the LV image on a display device 103. The display controller 102 executes a plurality of processes such as format conversion suitable for the display device 103, and transfers the image data for LV display to the display device 103. Here, for example, a process of adding pixels of a fixed color to the periphery of the LV image in order to fit to the output size of the display device 103, and a process of embedding the shooting period of the LV image and so forth in the image data are performed. Further, the display controller 102 also performs processing for superimposing so-called OSD (On-Screen Display) images or the like.

The display device 103 is, for example, an LCD (Liquid Crystal Display) or an EVF (Electric View Finder), and displays an image transferred from the display controller 102 according to a display V (vertical) sync signal described later.

An operation circuit 110 detects a user operation on a plurality of operation members (not shown) and sends a signal indicating the operation content to a controller 104 via a bus 106. The plurality of operation members include a shutter release button for instructing shooting of a still image, and a switch SW1 is turned on by the first stroke (for example, half-press) of the shutter release button and an instruction to prepare for shooting a still image is given. Further, a switch SW2 is turned on by a second stroke (for example, full press) of the shutter release button, and an instruction to shoot a still image is given. If the switch SW2 is kept in the ON state, continuous shooting of still images is instructed while the ON state is kept.

The controller 104 is composed of a microcomputer and the like, controls the operation of the entire digital camera, gives various instructions to each functional block forming the digital camera, and executes various control processes. The controller 104 controls the recording image processor 101, the display controller 102, the data transfer circuit 105, the temporary memory 107, a memory 108, and the display image processor 109, which are connected via the bus 106 in response to a signal indicating the operation content of the user operation sent from the operation circuit 110. The controller 104 realizes each process of the present embodiment by executing the program recorded in the memory 108.

The data transfer circuit 105 is composed of a plurality of Direct Memory Access controllers (DMAC) that perform data transfer. The image data is output to the bus 106 by the DMAC and temporarily stored in the temporary memory 107. The image data stored in the temporary memory 107 is output to the bus 106 by the DMAC and is output to the recording image processor 101, the display image processor 109, and the display controller 102 which are connected to the data transfer circuit 105.

The bus 106 is composed of a system bus and a data bus, and each has an independent bus configuration.

The temporary memory 107 is composed of a memory controller and a memory, and writes data to the memory and reads data from the memory according to an instruction from the controller 104 or the data transfer circuit 105. The memory is a storage device having a sufficient storage capacity to store a predetermined number of still images, a moving image for a predetermined time, data such as sound, constants for operation of the controller 104, programs, and the like, and composed of DRAM or the like, for example. Further, the memory can be composed of a plurality of memories.

The memory 108 is composed of a non-volatile memory controller and a non-volatile memory (not shown). The non-volatile memory controller writes data to the non-volatile memory or reads data from the non-volatile memory according to an instruction from the controller 104. The non-volatile memory is an electrically erasable/recordable memory, and for example, an EEPROM or the like is used. The non-volatile memory stores constants for operating the controller 104, programs, and the like.

Figure 2:
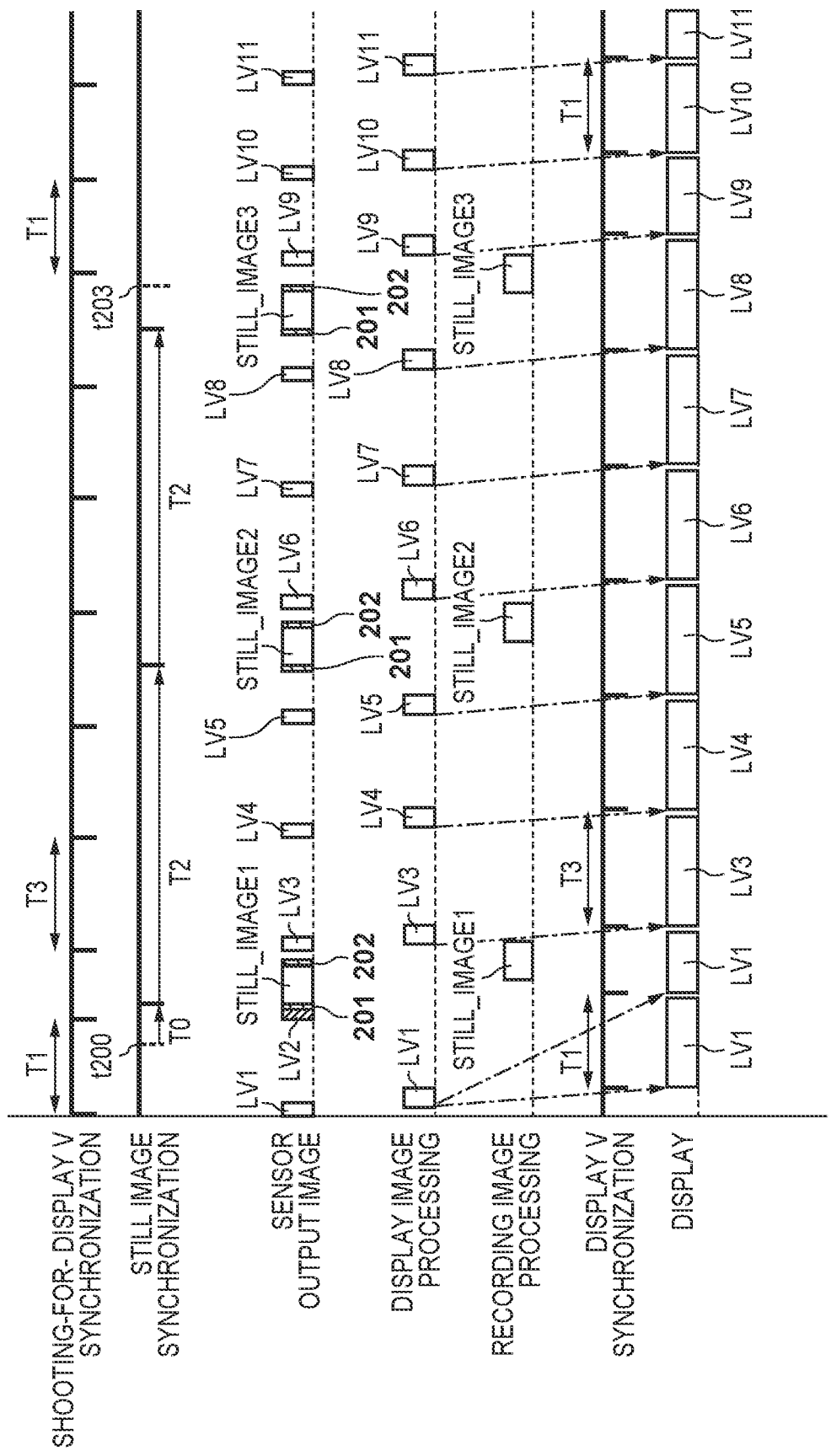
FIG. 2 is a timing chart showing timings of shooting and displaying images according to a first embodiment.

FIG. 2 is a tinting chart showing timings of shooting and displaying images in the first embodiment, and more specifically, showing timings in the case of continuously shooting still images for recording during LV display (i.e., during LV image shooting).

In FIG. 2, "shooting-for-display V synchronization" indicates the timing of a vertical synchronization signal for shooting LV images by the image sensor 100, and is a tinting signal for outputting images of 60 frames per second, for example.

"Still image synchronization" indicates drive timings for shooting still images by the image sensor 100, and more specifically, is a synchronization signal showing the timing of shooting the first still image, and the timings of shooting the second and subsequent still images that occur at every shooting interval T2. Tinting t200 indicates the timing at which the switch SW2 is turned on by the user pressing the shutter release button, and the still image synchronization signal is generated after a release time lag T0.

"Sensor output image" indicates a shooting period from the start of charge accumulation of an image in the image sensor 100 to the end of reading the accumulated charge, and the sensor switching time. Note that the LV images are represented as LV1 to LV11, and the still images are represented as STILL_IMAGE1 to STILL_IMAGE3. Further, frames 201 indicate a switching time for switching the driving of the image sensor 100 to shoot a still image from to shoot an LV image, and frames 202 indicate a switching time for switching the driving of the image sensor 100 to shoot an LV image from to shoot a still image. The shooting period of the LV image is different from the shooting period of the still image because the number of pixels to be read out is different, the exposure period is different, d so on. LV2 shown by the shaded frame indicates that the LV image cannot be obtained because the still image shooting starts before the reading of the LV image ends.

"Display image processing" indicates timings of image processing in the display image processor 109. In each of the periods of LV1 and LV3 to LV11, first, pixel signals of an LV image sequentially read from the image sensor 100 and recorded in the temporary memory 107 are sequentially read by the display image processor 109 via the data transfer circuit 105. Then, the image data of the LV image processed by the display image processor 109 is output to the display controller 102 via the data transfer circuit 105.

Further, LV1 and LV3 to LV11 in the "display image processing" show that the display image processor 109 starts processing pixel signals before all the pixel signals for one screen from the image sensor 100 are recorded in the temporary memory 107. The data transfer circuit 105 controls so that only the pixel signals recorded in the temporary memory 107 are read out to the display image processor 109. In other words, the display image processor 109 is controlled so that it does not read out the pixel signals before the pixel signals from the image sensor 100 starts being written to the temporary memory 107.

"Recording image processing" indicates timings of image processing in the recording image processor 101. In each of the periods of STILL_IMAGE1 to STILL_IMAGE3, first, pixel signals of a still image read from the image sensor 100 and recorded in the temporary memory 107 are sequentially transferred to the recording image processor 101 via the data transfer circuit 105. Then, the image data of the still image processed by the recording image processor 101 is recorded in the temporary memory 107 via the data transfer circuit 105.

Similarly to LV1 and LV3 to LV11, STILL_IMAGE to STILL_IMAGE3 in the "recording image processing" shows that the the recording image processor 101 starts processing pixel signals before all the pixel signals for one screen from the image sensor 100 are recorded in the temporary memory 107. In this way, if the bandwidth of the system allows, pixel signals of a still image may be transferred to the recording image processor 101 while pixels signals from the image sensor 100 are being written to the temporary memory 107, as in the case of the LV image.

"Display V synchronization" indicates a vertical sync signal for starting display on the display device 103, and is a timing signal for displaying images of 60 frames per second, for example. The "display V synchronization" is set so that the time since an LV image is read at the timing indicated by the "sensor output image" until the LV image is displayed on the display device 103 becomes shortest in the system. That is, the vertical sync signal of the "display V synchronization" is generated after a delay of a certain period of time since the vertical sync signal of the "shooting-for-display V synchronization" is generated.

"Display" indicates timings of displaying the images processed by the display controller 102 on the display device 103.

Next, control of the "shooting-for-display V synchronization" and the "display V synchronization" in this embodiment will be described with reference to FIG. 2.

At timing t200 in FIG. 2, when the switch SW2 is turned on by the user pressing the shutter release button, a still image synchronization signal is generated after the release time lag T0, and the shooting of a still image starts. Since the shooting period of STILL_IMAGE1 overlaps the shooting period of LV2, the shooting of LV2 is interrupted and the shooting of STILL_IMAGE1 is started. At that time, in order to acquire a still image, the drive of the image sensor 100 is switched from the drive for LV image shooting to the drive for still image shooting. Further, since the shooting of LV2 is interrupted and there is no LV image to be displayed next to LVI, the LV image of LV1 is kept displayed.

Next, when the shooting of the still image is completed, the drive of the image sensor 100 is switched from the drive for still image shooting to the drive for LV image shooting in order to acquire an LV image for display.

Here, the vertical synchronization signal of the shooting-for-display V synchronization and the vertical synchronization signal of the display V synchronization are adjusted so that the shooting periods of STILL_IMAGE2 and subsequent still images and the shooting periods of the LV images do not overlap. In the present embodiment, by adjusting the cycle of the vertical sync signal of the display V synchronization to a cycle that is an integral multiple of the continuous shooting speed of the still images, it is possible to avoid overlapping the shooting periods of STILL_IMAGE2 and subsequent still images and the shooting periods of the LV images. Further, the display V synchronization is controlled so as to reduce a delay in display, and LV3 and subsequent LV images are displayed.

Timing t203 indicates the timing when the user releases the shutter release button, and the continuous shooting is ended. After the continuous shooting is ended, the vertical sync signal of the shooting-for-display V synchronization and the vertical sync signal of the display V synchronization are returned to the normal cycle to capture and display LV images.

Figure 3:
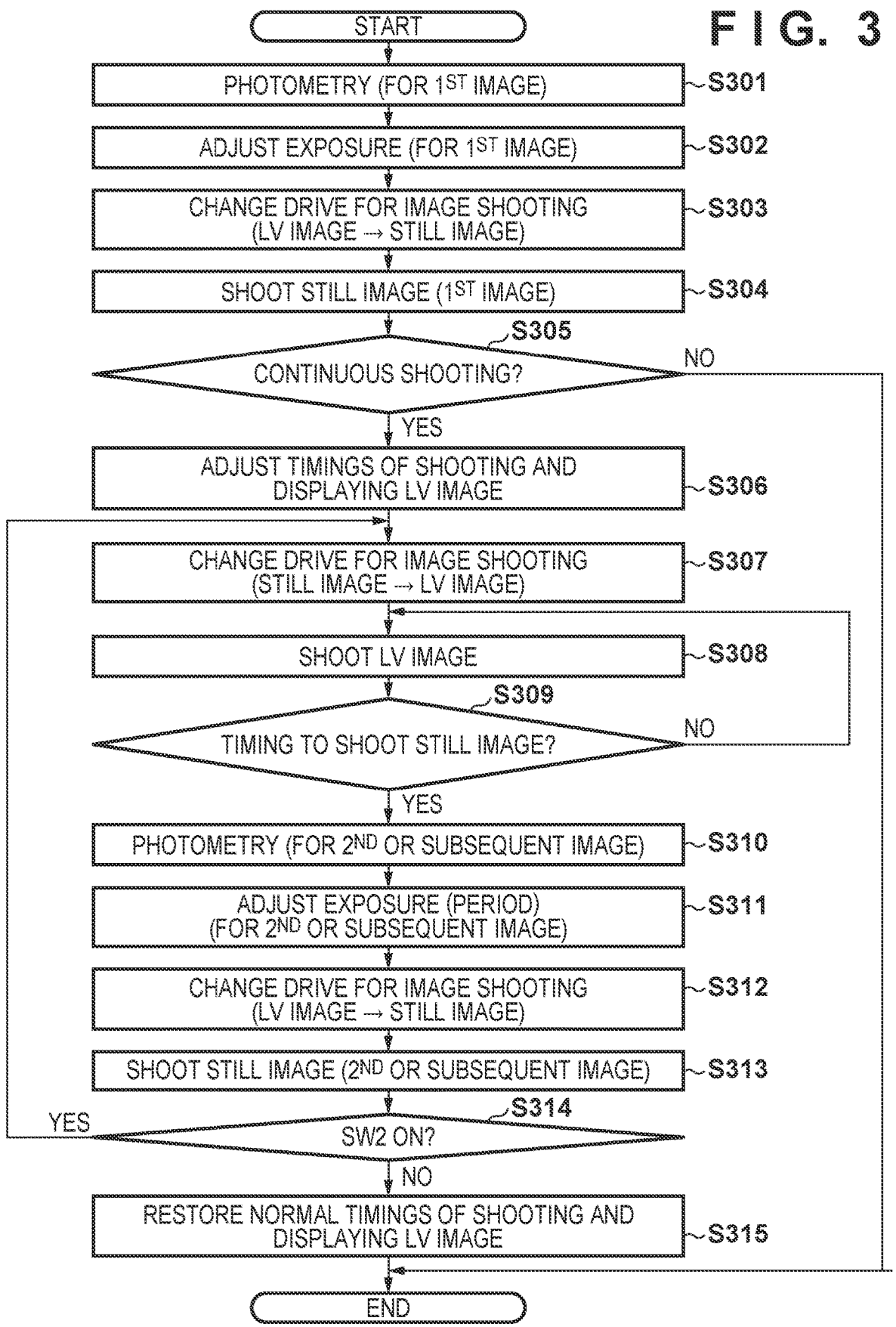
FIG. 3 is a flowchart showing shooting and display processing according to the first embodiment.

FIG. 3 is a flowchart showing shooting and display processing in the first embodiment, which is controlled by the controller 104. This processing is started at the timing When the user presses the shutter release button during the LV display (while the LV images are being captured) and the switch SW2 is turned on.

In step S301, photometry is performed by a known method using the LV image captured previously, and in step S302, control of adjusting the exposure is performed so that the exposure of the still image becomes a desired exposure based on the obtained photometric value. Note that as for processes in steps S301 and S302, the exposure may be controlled using the LV image obtained immediately before the preparation instruction for the still image is issued (for example, the timing when the switch SW1 is turned on) instead of when the switch SW2 is turned on.

In step S303, the drive of the image sensor 100 is switched from drive for LV image shooting to the drive for still image shooting. The frames 201 in the timing chart of FIG. 2 correspond to this period. Then, in step S304, the first still image is captured with the exposure adjusted in step S302.

In step S305, it is determined whether or not continuous shooting of still images is instructed. Here, in the still image shooting instruction, for example, if the shutter release button is kept pressed and the switch SW2 is ON, it is determined that the continuous shooting is instructed, and if not, the single shooting is instructed. In the case of continuous shooting, the process proceeds to step S306, and in the case of single shooting, this processing ends.

In step S306, the vertical sync signal of the shooting-for-display V synchronization is adjusted so that the shooting periods of STILL_IMAGE2 and the subsequent still images do not overlap with the shooting periods of the LV images, Further, the vertical sync signal of the display V synchronization is also adjusted in accordance with the vertical sync signal of the shooting-for-display V synchronization. In the present embodiment, by adjusting the cycle of the vertical sync signal of the shooting-for-display V synchronization and the cycle of the vertical sync signal of the display V synchronization to a cycle that is an integral multiple of the continuous shooting speed of the still images, overlapping of the shooting periods of STILL_IMAGE2 and subsequent still images and the shooting periods of the LV images is avoided.

It should be noted that by adjusting the cycle of the adjusted vertical sync signal so that it becomes closest to the cycle of the unadjusted vertical sync signal when the continuous shooting speed of a still image is multiplied by an integer, it is possible to reduce the unnaturalness of the LV display caused by the change in the cycle.

In step S307, the drive of the image sensor 100 is switched from the drive for still image shooting to the drive for LV image shooting, and an LV image is shot in step S308.

In step S309, it is determined whether or not it is the timing to shoot the next still image. If it is not the timing to shoot the still image, the process returns to step S308 to shoot an LV image. On the other hand, if it is the timing to shoot the still image, the process proceeds to step S310.

In step S310, photometry is performed by a known method using the LV image, and in step S311, the exposure is controlled based on the obtained photometric value so that the exposure of the still image becomes a desired exposure. Then, in step S312, the drive of the image sensor 100 is switched from the drive for LV image shooting to the drive for still image shooting. The frames 202 in the timing chart of FIG. 2 corresponds to this period. In step 5313, the second or subsequent still image is captured.

In step S314, it is determined whether or not the switch SW2 is still ON. If the switch SW2 is still ON, the process returns to step S307 and the above processes are repeated. If the switch SW2 is OFF, the process proceeds to step S315.

In step S315, since the continuous shooting has ended, in order to perform normal shooting and display of LV images, the vertical sync signal for the shooting-for-display V synchronization and the vertical sync signal for the display V synchronization are returned to a normal cycle (for example, 60 fps), and the processing is ended.

According to the first embodiment as described above, a vertical sync signal for shooting LV images and a vertical sync signal for displaying the LV images are controlled so as to be generated at a cycle of an integral multiple of continuous shooting speed of still images. As a result, it is possible to prevent the shooting periods of STILL_IMAGE2 and subsequent still images and the shooting periods of the LV images from overlapping, and even if no still image is used for LV display, it is possible to prevent the blackout of the LV display, wiggling of LV display, and so on.

In the present embodiment, both the cycles of the vertical sync signals of the shooting-for-display V synchronization and the display V synchronization are changed, but only the vertical sync signal of the shooting-for-display V synchronization may be changed. In the case where only the vertical sync signal of the shooting-for-display V synchronization is changed, there may be a case where the processing by the display image processor 109 will not be completed in time depending on the timing, in which case, the LV image displayed immediately before is continuously displayed.

Second Embodiment

Next, a second embodiment of the present invention will be described. Note that the image capturing apparatus used in the second embodiment is the same as that described in the first embodiment, and description thereof will be omitted.

Figure 4:
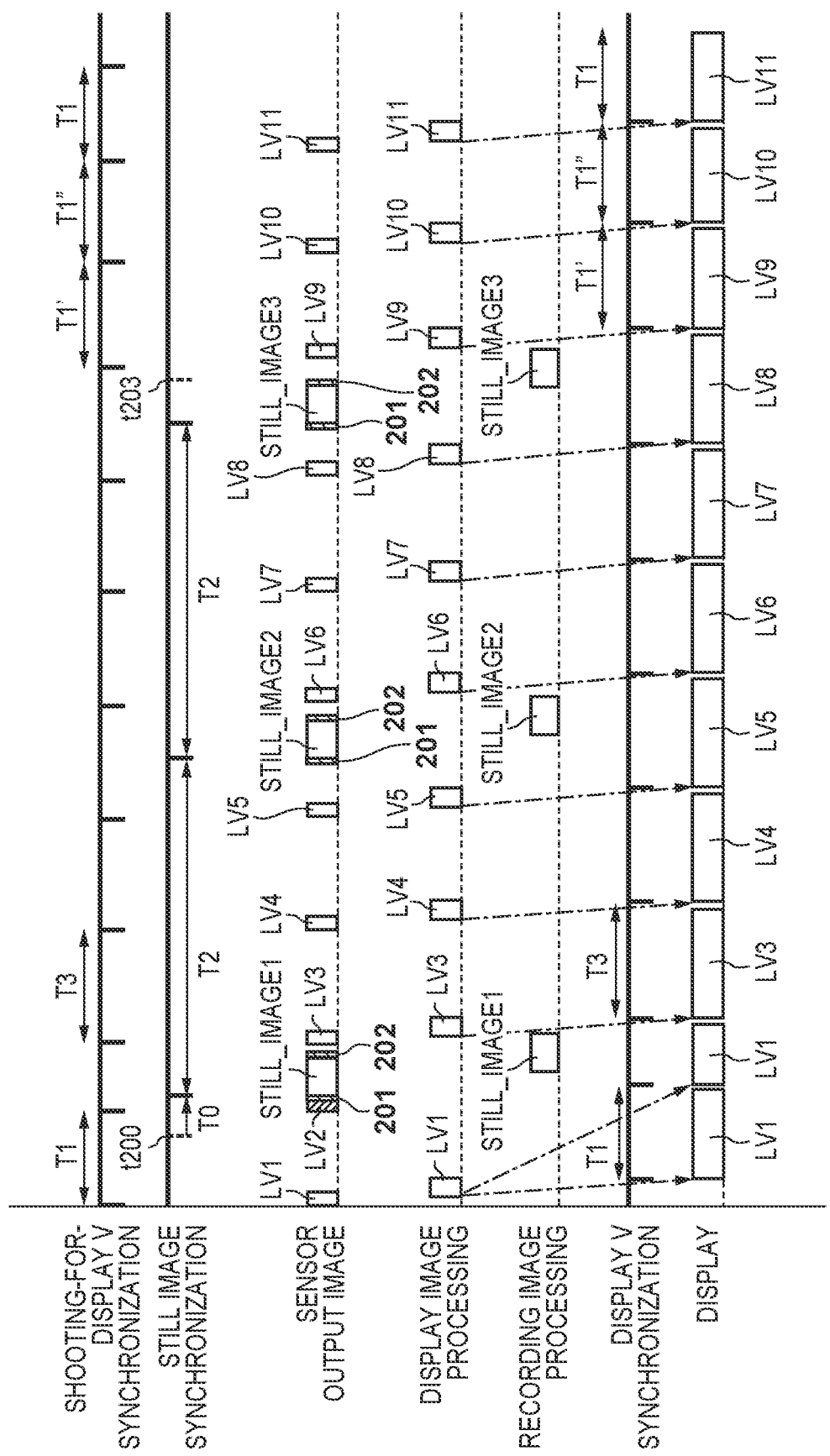
FIG. 4 is a timing chart showing timing of shooting and displaying images according to a second embodiment.

FIG. 4 is a timing chart showing timings of shooting and displaying images in the second embodiment, and more specifically, showing timings in the case of continuously shooting still images for recording during LV display during LV image shooting). The same signals as those shown in FIG. 2 are designated by the same reference numerals, and the description thereof will be omitted. The difference between FIG. 4 and FIG. 2 is that when the vertical sync signal of the shooting-for-display V synchronization and the vertical sync signal of the display V synchronization are returned to the normal cycle after continuous shooting of still images is ended, they are gradually returned instead of being returned at once. This is to reduce the shock of switching the display cycle on the LV display.

In FIG. 4, timing t203 is a timing at which the user releases the shutter button, and is a timing at which continuous shooting ends. Until the timing t203, the processing is performed at the same timings as in FIG. 2, and thus the description will be omitted.

After the continuous shooting is ended, the vertical sync signal of the shooting-for-display V synchronization and the vertical sync signal of the display V synchronization are returned to the normal cycle, but in the present embodiment, three frames are used to return to the normal cycle. Here, T3>T1'>T1">T1, and the cycle is gradually returned to the normal cycle (for example, 60 fps) step by step.

According to the second embodiment as described above, in addition to the same effect as the first embodiment, when the vertical sync signal of the shooting-for-display V synchronization and the vertical sync signal of the display V synchronization are returned to the normal cycle after the continuous shooting is ended, they are gradually returned instead of being returned at once. As a result, the shock of switching the display cycle on the LV display can be reduced.

The present invention may be applied to a system including a plurality of devices or an apparatus constituted by a single device.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-163270, filed on Sep. 6, 2019 which is hereby incorporated by reference herein in its entirety.

What is claimed is:

1. An image capturing apparatus comprising:
an image sensor; and
a controller that controls the image sensor to shoot images for a live view display to be sequentially displayed on a display device at a predetermined first cycle and controls to shoot a still image in response to an image shooting instruction,
wherein, in a case where continuous shooting of still images is instructed during shooting the images for the live view display at the first cycle, the controller changes a cycle at which the images for the live view display are shot to a second cycle which corresponds to an integer multiple of speed of the continuous shooting of the still images while the continuous shooting is performed, and
controls the image sensor to shoot the still images at the speed of the continuous shooting and shoot the images for the live view display at the second cycle.

2. The image capturing apparatus according to claim 1, wherein, in a case where an end of the continuous shooting is instructed, the controller changes the second cycle to the first cycle step by step in response to the end of the continuous shooting.

3. The image capturing apparatus according to claim 1 further comprising a display controller that controls to display the images for the live view display on the display device at a predetermined first display cycle,
wherein, in a case where the continuous shooting of still images is instructed while the images for display are displayed at the first display cycle, the display controller changes a display cycle at which the images for the live view display are displayed to a second display cycle which corresponds to an integer multiple of the speed of the continuous shooting while the continuous shooting is performed.

4. The image capturing apparatus according to claim 3, wherein, in a case where end of the continuous shooting is instructed, the display controller changes the second display cycle to the first display cycle step by step.

5. The image capturing apparatus according to claim 3, wherein the first cycle and the first display cycle are the same cycle.

6. The image capturing apparatus according to claim 3, wherein the second cycle and the second display cycle are the same cycle.

7. The image capturing apparatus according to claim 3, wherein the second display cycle is a cycle closest to the first display cycle among cycles corresponding to integer multiples of the speed of the continuous shooting.

8. The image capturing apparatus according to claim 1 further comprising:
a display controller that controls to display the images for the live view display on the display device at a predetermined display cycle; and
a processor that processes the images for the live view display shot by the image sensor,
wherein, in a case where a timing for displaying a next image has come due to the display cycle before the processor finishes processes on the images for the live view display shot at the second cycle, the display controller controls to continuously display the images for the live view display displayed immediately before.

9. The image capturing apparatus according to claim 1, wherein the second cycle is a cycle closest to the first cycle among cycles corresponding to integer multiples of the speed of the continuous shooting.

10. A control method of an image capturing apparatus having an image sensor comprising:
shooting images for a live view display to be sequentially displayed on a display device at a predetermined first cycle by the image sensor;
changing, in a case where continuous shooting of still images is instructed during shooting the images for the live view display at the first cycle, a cycle at which the images for the live view display are shot to a second cycle which is an integer multiple of the continuous shooting speed of the still images while the continuous shooting is performed,
shooting the still images at the speed of the continuous shooting and shooting the images for the live view display at the second cycle by the image sensor.

11. A non-transitory computer-readable storage medium, the storage medium storing a program that is executable by a computer, wherein the program includes program code for causing the computer to perform a control method of an image capturing apparatus having an image sensor comprising:

shooting images for a live view display to be sequentially displayed on a display device at a predetermined first cycle by the image sensor;

changing, in a case where continuous shooting of still images is instructed during shooting the images for the live view display at the first cycle, a cycle at which the images for the live view display are shot to a second cycle which is an integer multiple of the continuous shooting speed of the still images while the continuous shooting is performed, shooting the still images at the speed of the continuous shooting and shooting the images for the live view display at the second cycle by the image sensor.

* * * * *